United States Patent
Wakebe et al.

(10) Patent No.: US 12,107,466 B2
(45) Date of Patent: Oct. 1, 2024

(54) TWISTING METHOD OF COIL SEGMENTS, TWISTING JIG AND TWISTING APPARATUS

(71) Applicant: ODAWARA ENGINEERING CO., LTD., Kanagawa (JP)

(72) Inventors: Noboru Wakebe, Kanagawa (JP); Yuji Miyazaki, Kanagawa (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 139 days.

(21) Appl. No.: 17/869,189

(22) Filed: Jul. 20, 2022

(65) Prior Publication Data

US 2022/0360151 A1 Nov. 10, 2022

Related U.S. Application Data

(63) Continuation of application No. PCT/JP2021/001379, filed on Jan. 15, 2021.

(30) Foreign Application Priority Data

Jan. 22, 2020 (JP) ................................. 2020-008526

(51) Int. Cl.
*H02K 15/085* (2006.01)
(52) U.S. Cl.
CPC .................. *H02K 15/085* (2013.01)
(58) Field of Classification Search
CPC .......... H02K 15/085; H02K 15/0087
See application file for complete search history.

(56) References Cited

U.S. PATENT DOCUMENTS

| 6,557,239 B2 * | 5/2003 | Takahashi ............ H02K 15/064 310/40 R |
| 6,694,598 B2 * | 2/2004 | Takahashi .......... H02K 15/0428 310/179 |

(Continued)

FOREIGN PATENT DOCUMENTS

| CN | 109746345 A | 5/2019 |
| DE | 102014206105 A1 | 10/2015 |

(Continued)

OTHER PUBLICATIONS

Extended European search report issued in European Appln. No. 21744813.3 mailed on Jul. 11, 2023.

(Continued)

*Primary Examiner* — Jeffrey T Carley
*Assistant Examiner* — Jose K Abraham
(74) *Attorney, Agent, or Firm* — ROSSI, KIMMS & McDOWELL LLP

(57) ABSTRACT

First receiving recesses for receiving distal end portions of slot insertion portions of normal coil segments, and second receiving recesses for receiving distal end portions of long slot insertion portions of variant coil segments are formed at circumferential intervals on outer peripheral surface of an inner twisting jig corresponding to the innermost layer. In a state where the distal end portions of the long slot insertion portions before being twisted are inserted into the second receiving recesses, the first receiving recesses are at positions displaced in the circumferential direction with respect to the distal end portions to be housed therein. Primary twisting is performed by rotating the inner twisting jig in this state, and then the distal end portions of the normal coil segments are inserted into the first receiving recesses and the secondary twisting is performed with a rotational amount larger than that of the primary twisting.

10 Claims, 16 Drawing Sheets

(56) References Cited

U.S. PATENT DOCUMENTS

| | | | | |
|---|---|---|---|---|
| 8,826,513 | B2* | 9/2014 | Guercioni | H02K 15/0421 29/598 |
| 2001/0007169 | A1* | 7/2001 | Takahashi | H02K 15/0428 29/596 |
| 2002/0053126 | A1* | 5/2002 | Maeda | H02K 15/0414 29/596 |
| 2003/0121139 | A1* | 7/2003 | Katou | H02K 15/0414 29/596 |
| 2003/0122441 | A1* | 7/2003 | Masegi | H02K 15/0428 310/208 |
| 2004/0041491 | A1* | 3/2004 | Gorohata | H02K 15/0428 310/187 |
| 2005/0166393 | A1* | 8/2005 | Sawada | H02K 15/0428 29/596 |
| 2009/0001841 | A1 | 1/2009 | Naganawa et al. | |
| 2013/0276295 | A1* | 10/2013 | Guercioni | H02K 15/0421 29/596 |
| 2014/0237811 | A1* | 8/2014 | Guercioni | H02K 15/0421 29/736 |
| 2017/0025932 | A1 | 1/2017 | Radtke et al. | |
| 2018/0212496 | A1* | 7/2018 | Gohs | H02K 15/024 |
| 2018/0375409 | A1* | 12/2018 | Yoshida | H02K 15/0087 |
| 2020/0274425 | A1 | 8/2020 | Miyazaki et al. | |
| 2021/0006140 | A1 | 1/2021 | Miyawaki et al. | |

FOREIGN PATENT DOCUMENTS

| | | | | |
|---|---|---|---|---|
| JP | 4006637 | B2 * | 11/2007 | |
| JP | 2009011116 | A | 1/2009 | |
| JP | 2016052234 | A | 4/2016 | |
| JP | 6685572 | B1 | 4/2020 | |
| WO | WO-2018233988 | A1 * | 12/2018 | H02K 15/0087 |
| WO | 2019093515 | A1 | 5/2019 | |
| WO | 2019182144 | A1 | 9/2019 | |
| WO | 2020022338 | A1 | 1/2020 | |

OTHER PUBLICATIONS

English translation of Written Opinion issued in Intl. Appln. No. PCT/JP2021/001379 mailed Apr. 6, 2021, previously cited in IDS filed Jul. 20, 2022.
International Preliminary Report on Patentability issued in Intl. Appln. No. PCT/JP2021/001379 mailed Aug. 4, 2022. English translation provided.
International Search Report issued in Intl. Appln. No. PCT/JP2021/001379 mailed Apr. 6, 2021. English translation provided.
Written Opinion issued in Intl. Appln. No. PCT/JP2021/001379 mailed Apr. 6, 2021.

* cited by examiner

[Fig. 1]
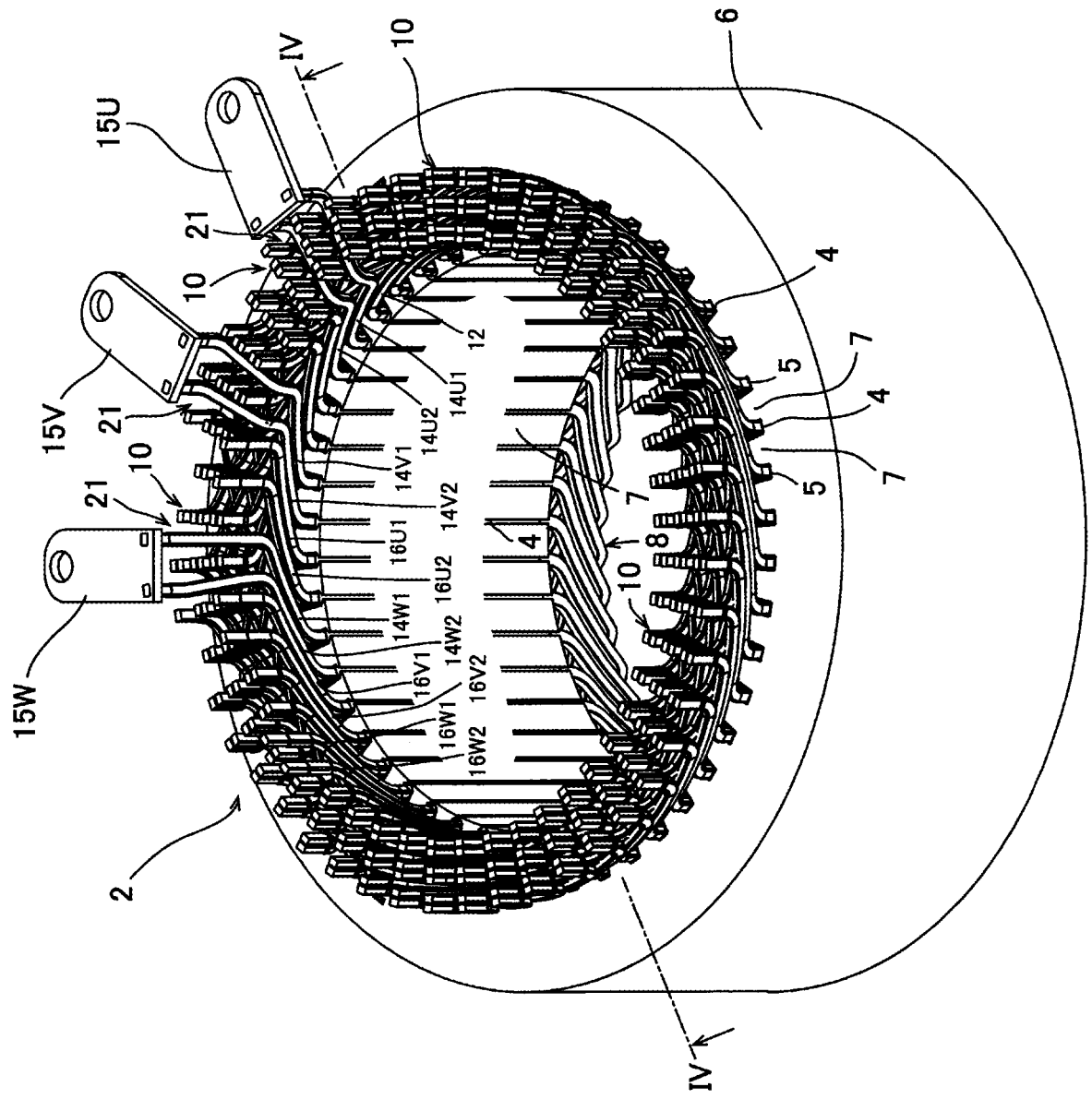

[Fig. 2A]
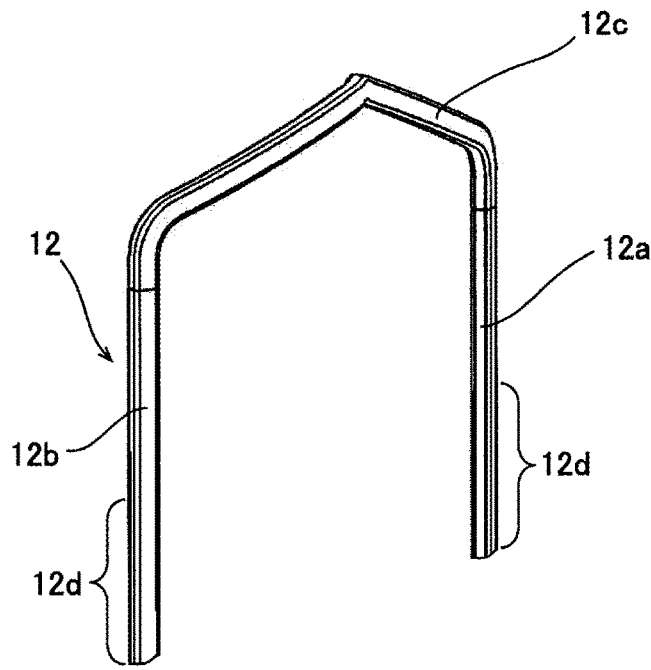
[Fig. 2B]
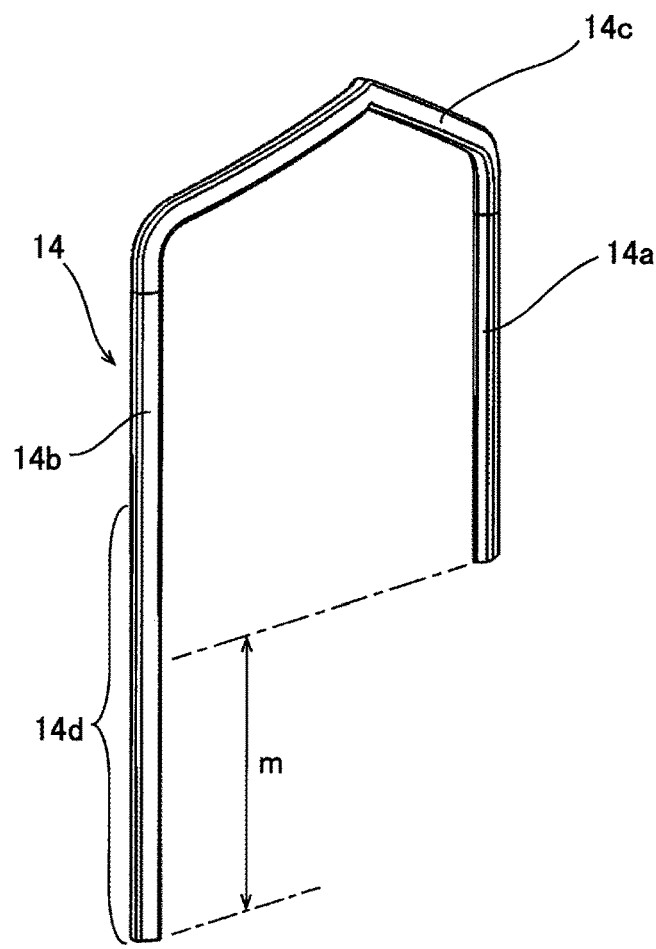

[Fig. 2C]
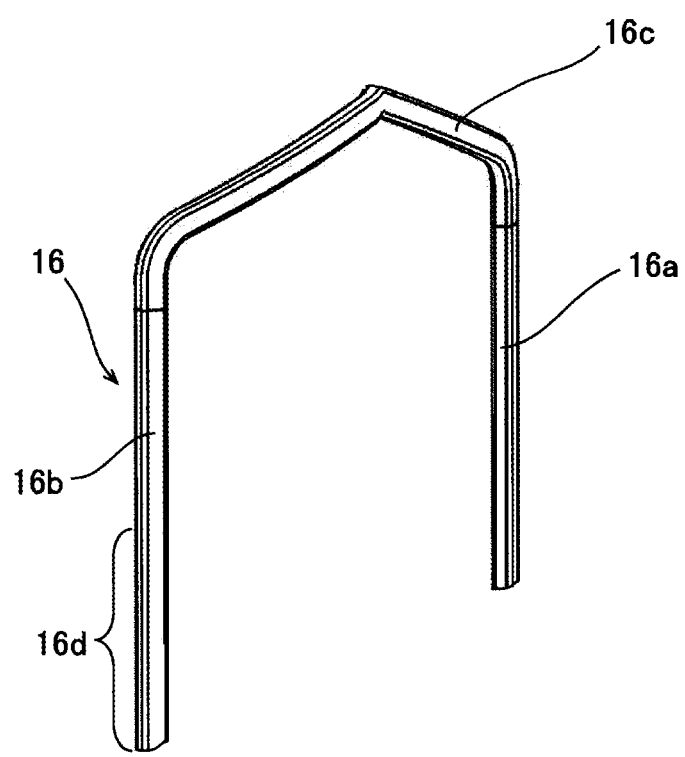

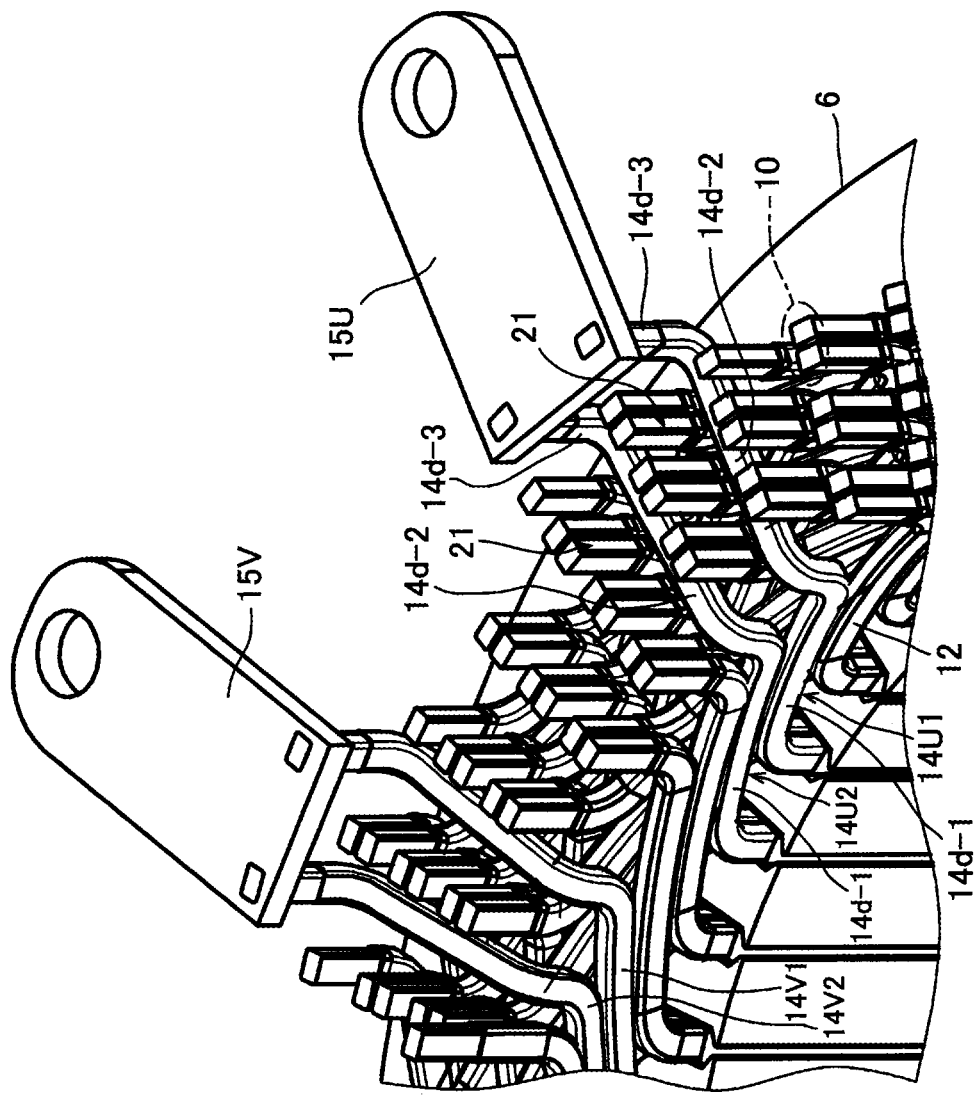
[Fig. 3]

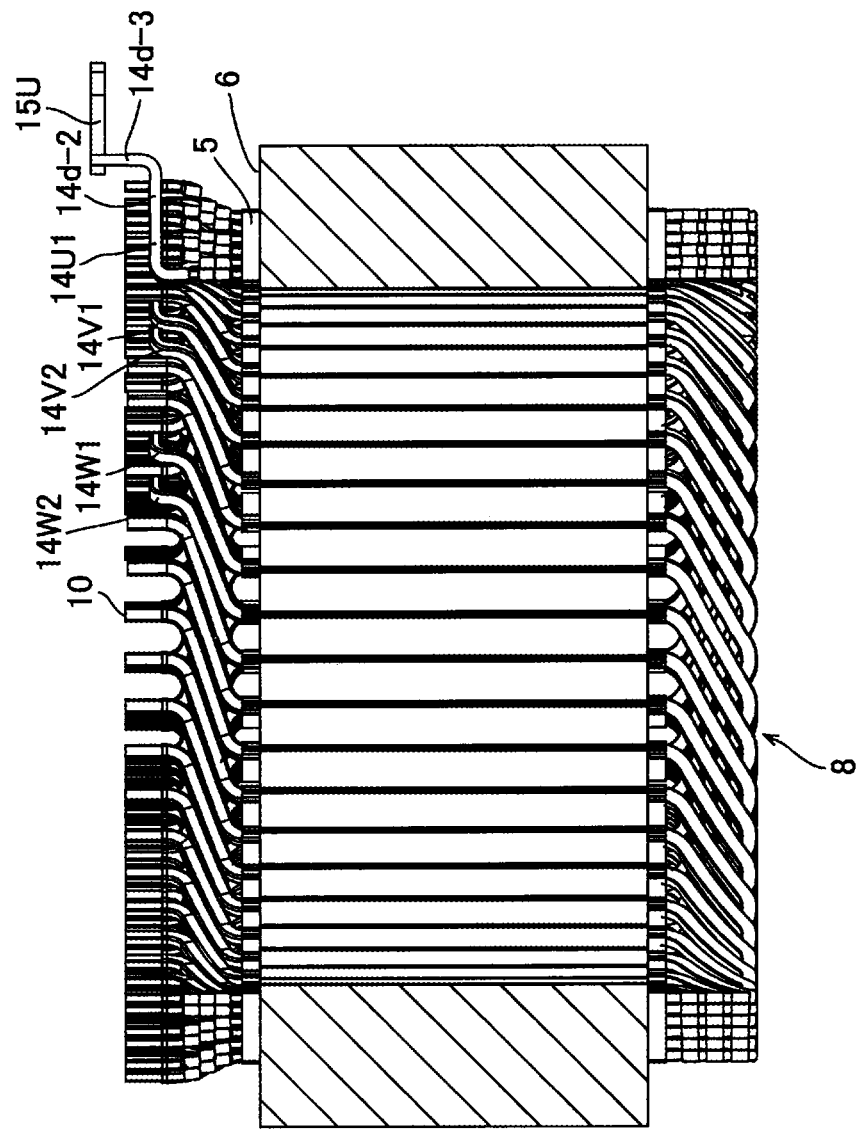

[Fig. 5]
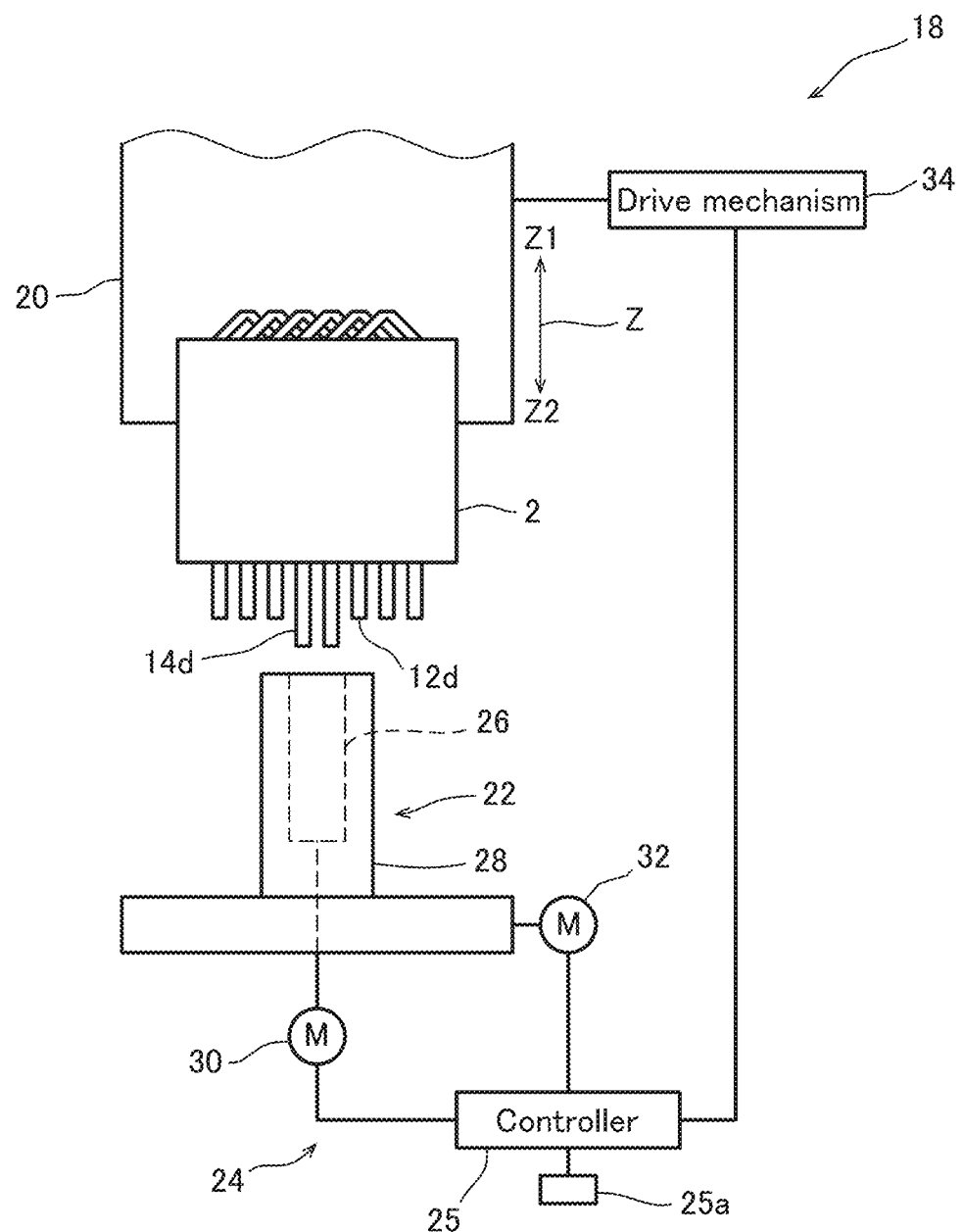

[Fig. 6]
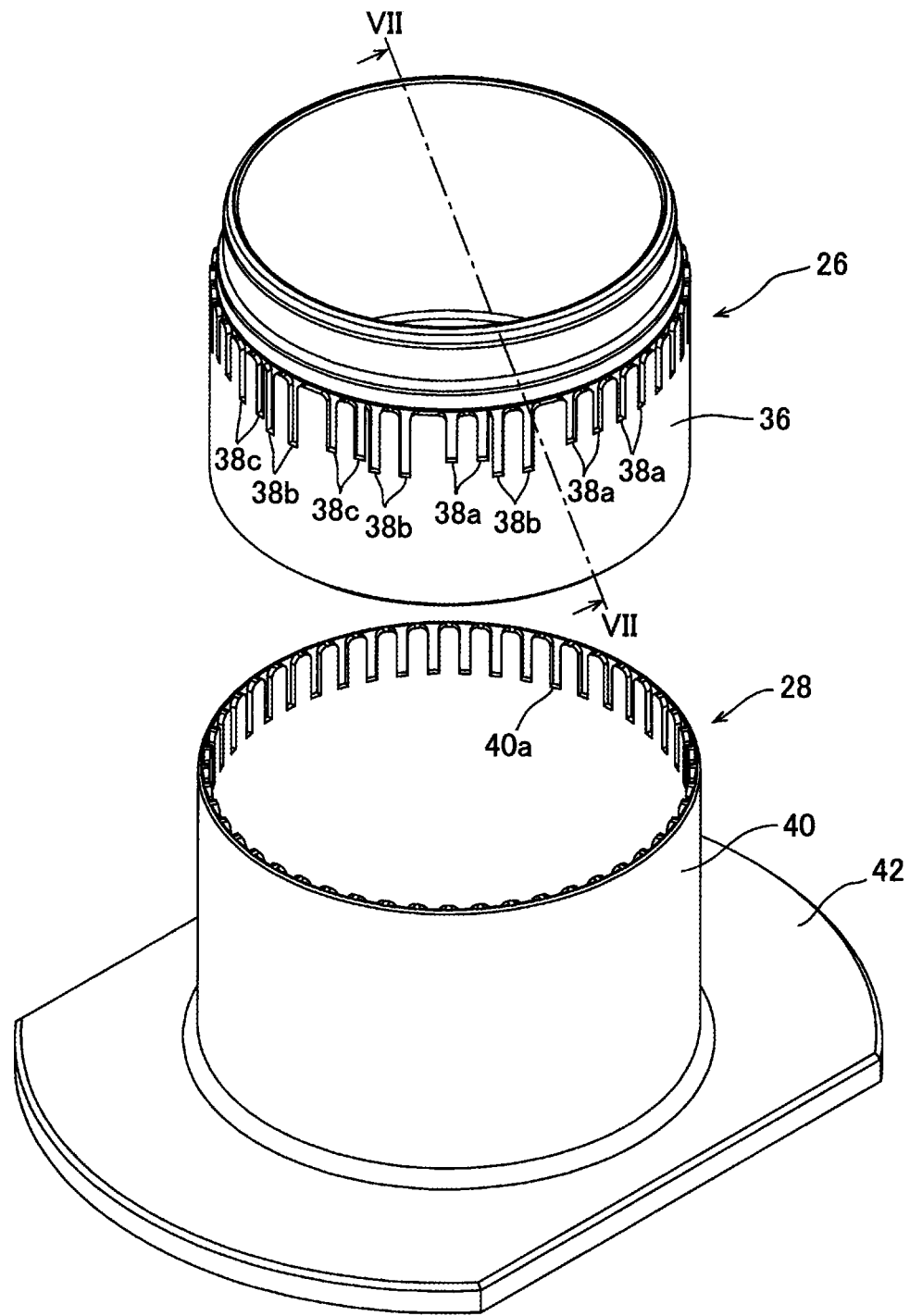

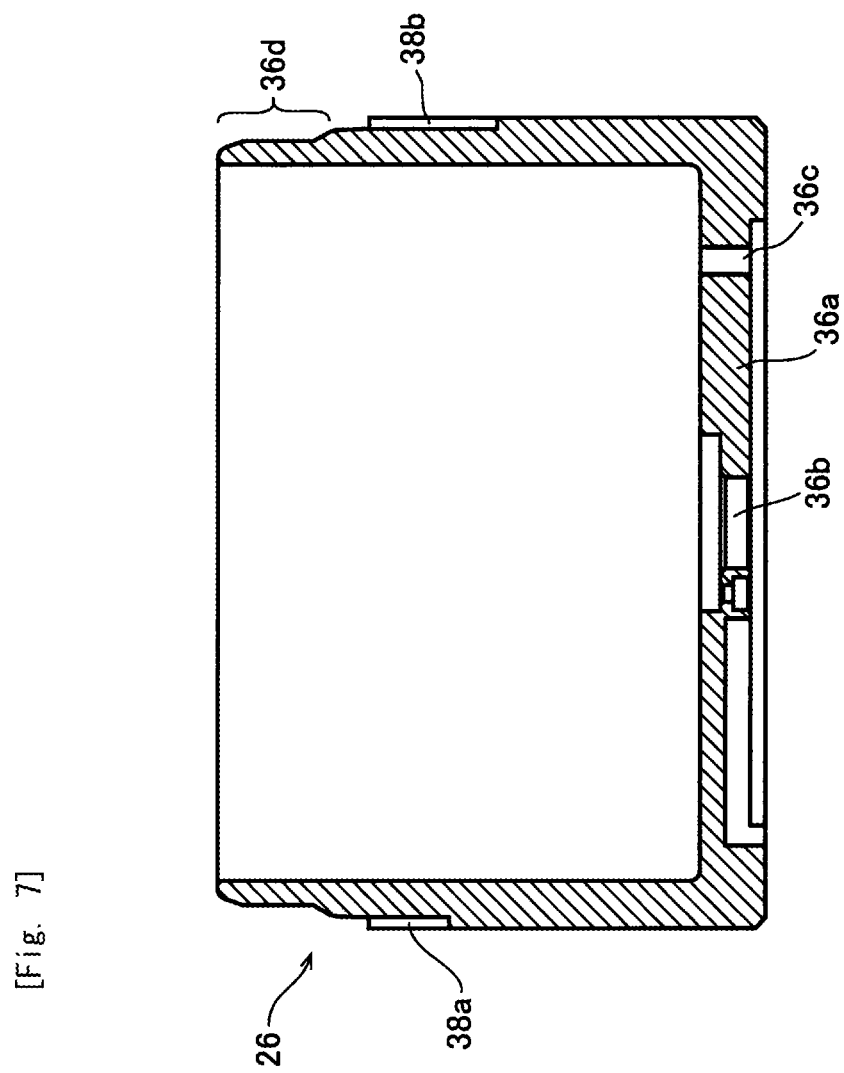

[Fig. 8A]
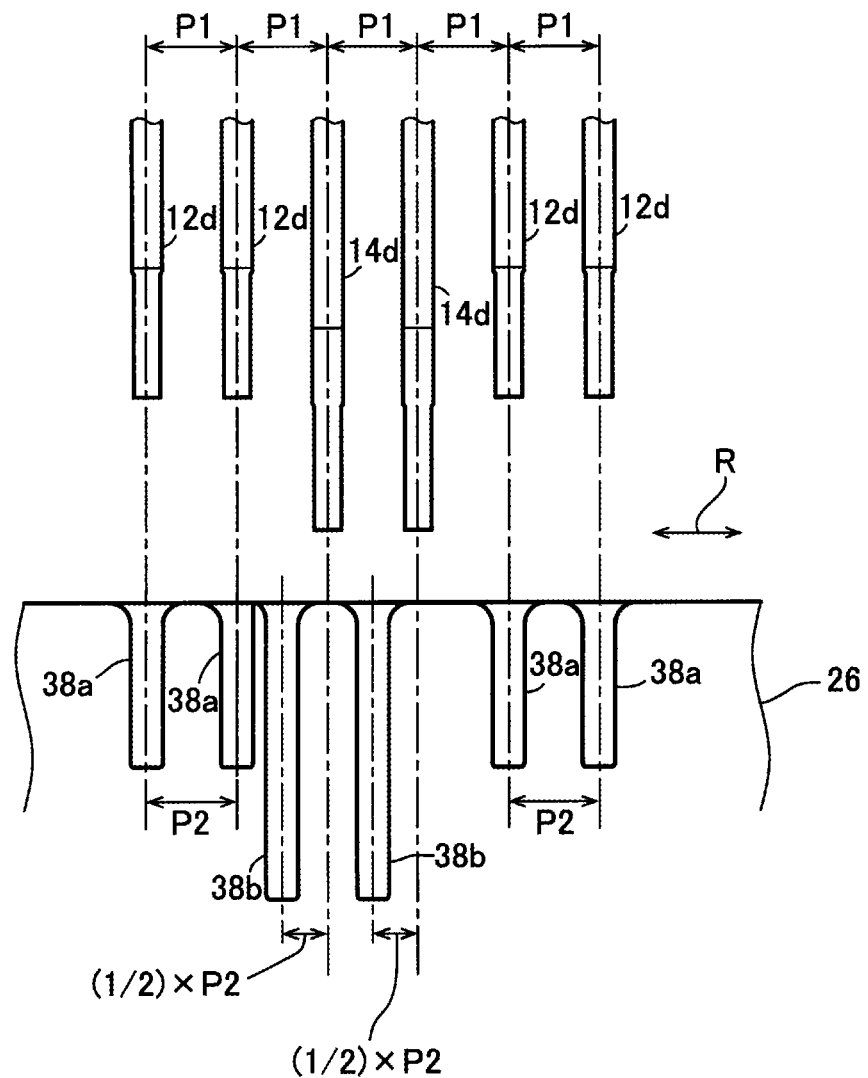

[Fig. 8B]
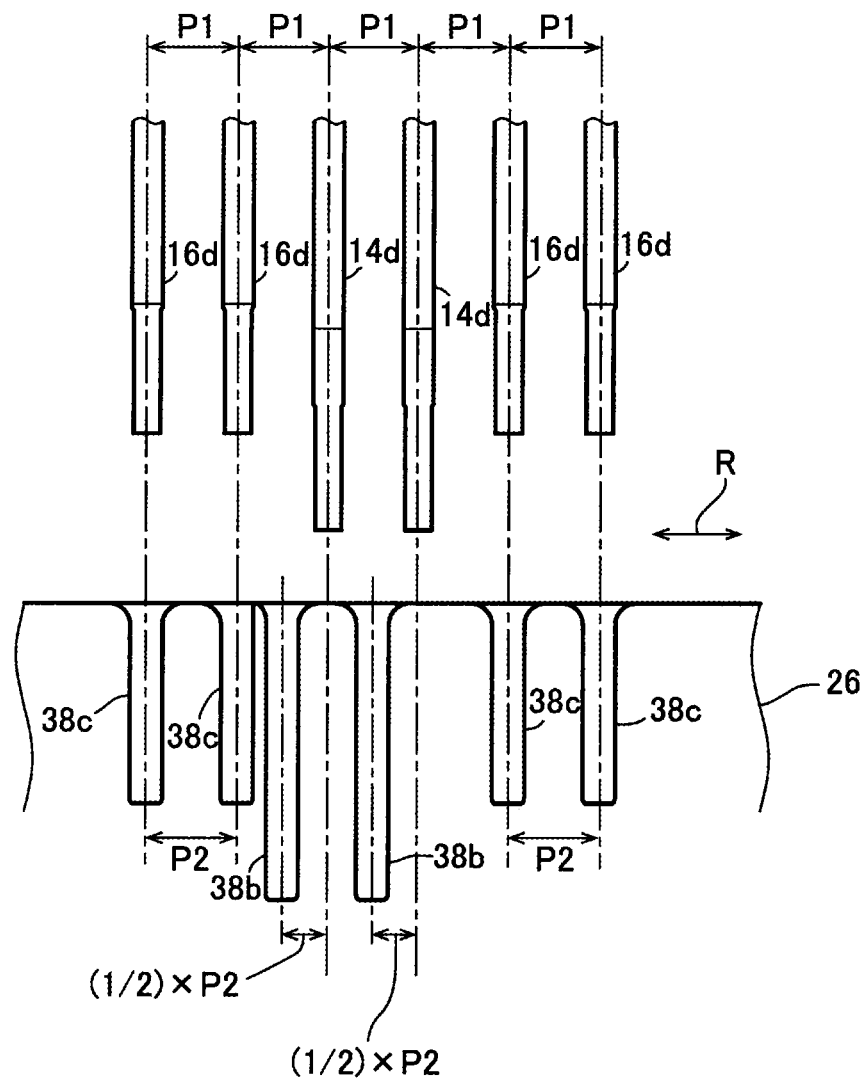

[Fig. 8C]
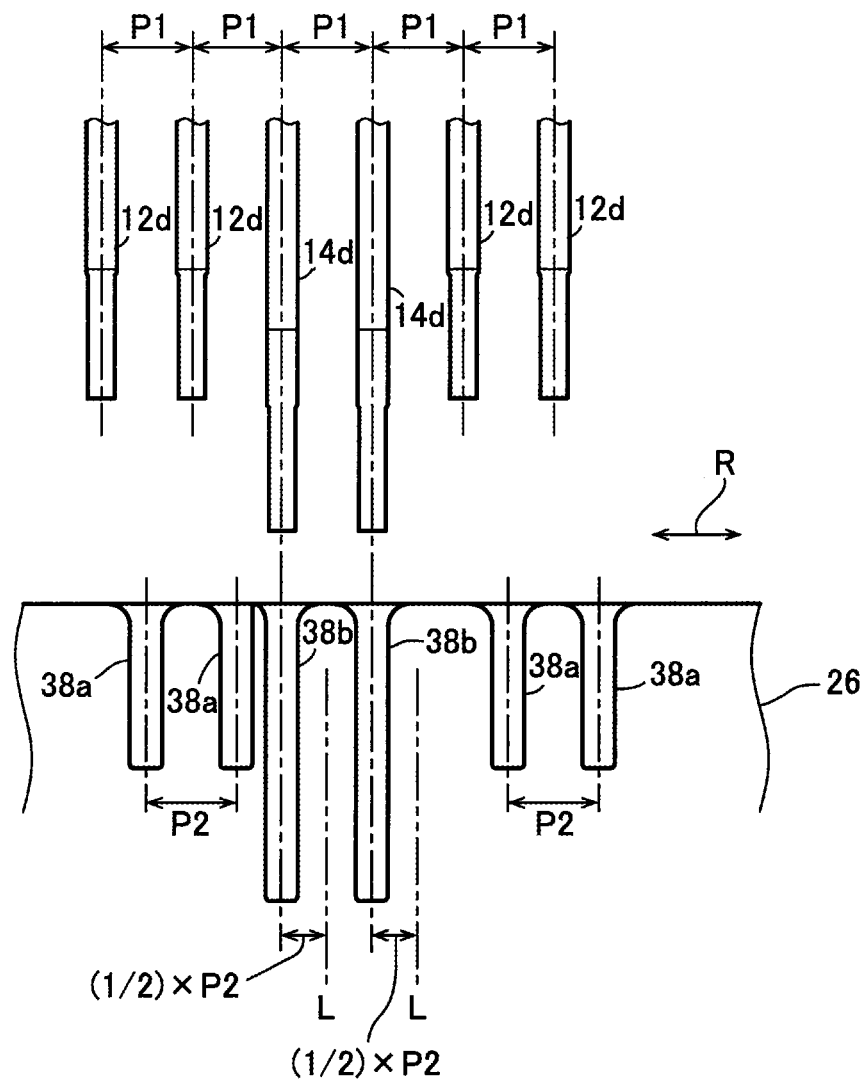

[Fig. 8D]
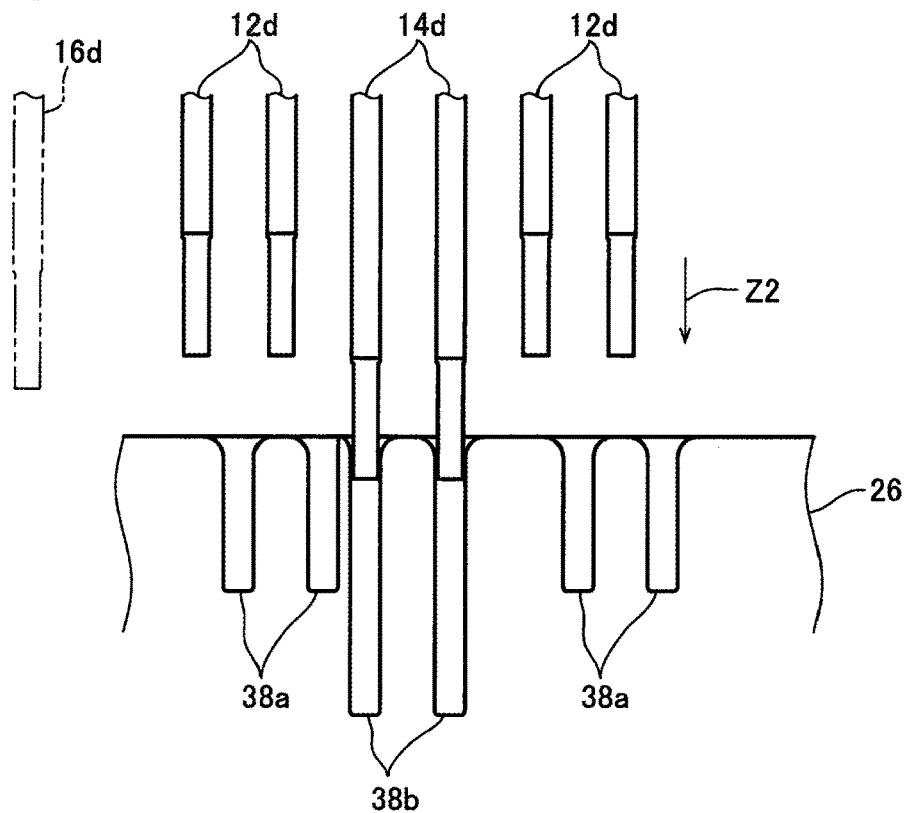
[Fig. 8E]
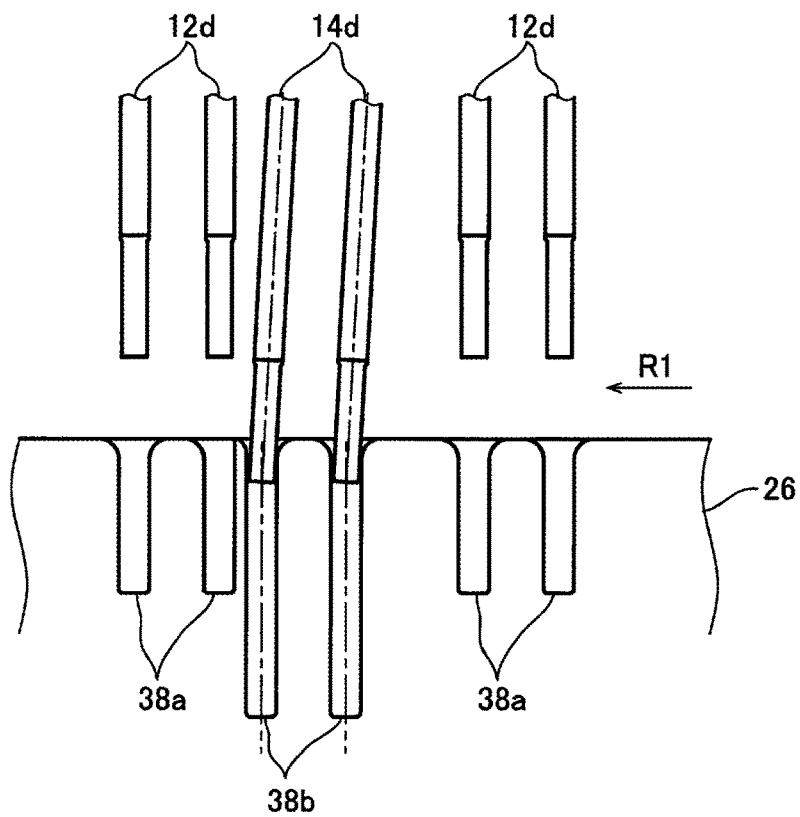

[Fig. 8F]
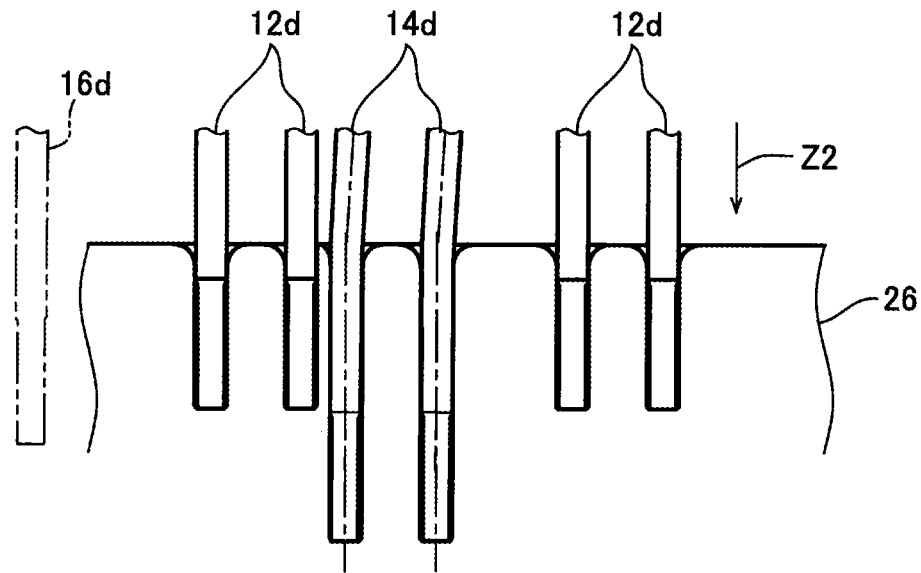
[Fig. 8G]
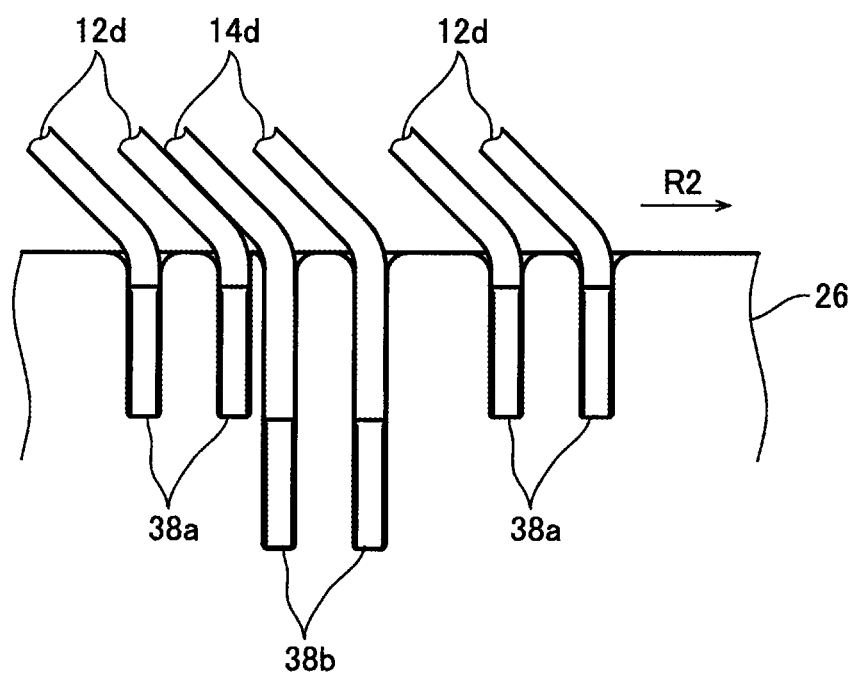

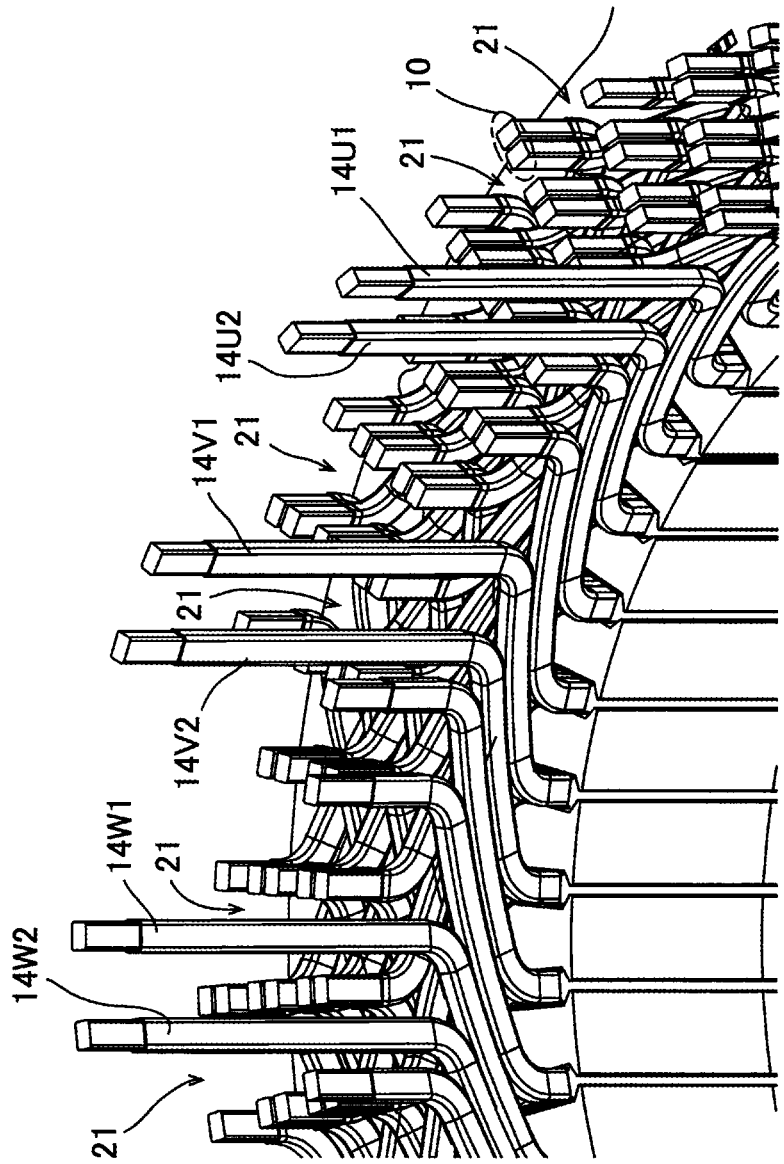
[Fig. 9]

[Fig. 10A]
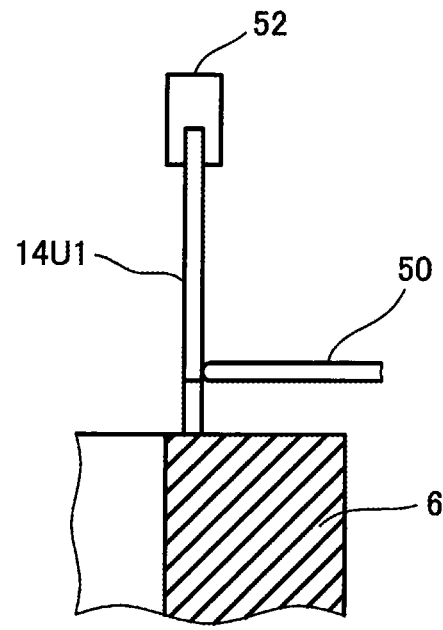
[Fig. 10B]
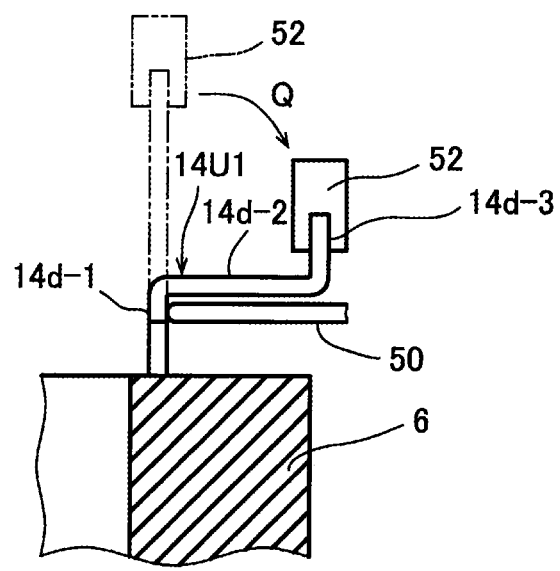

[Fig. 11A]
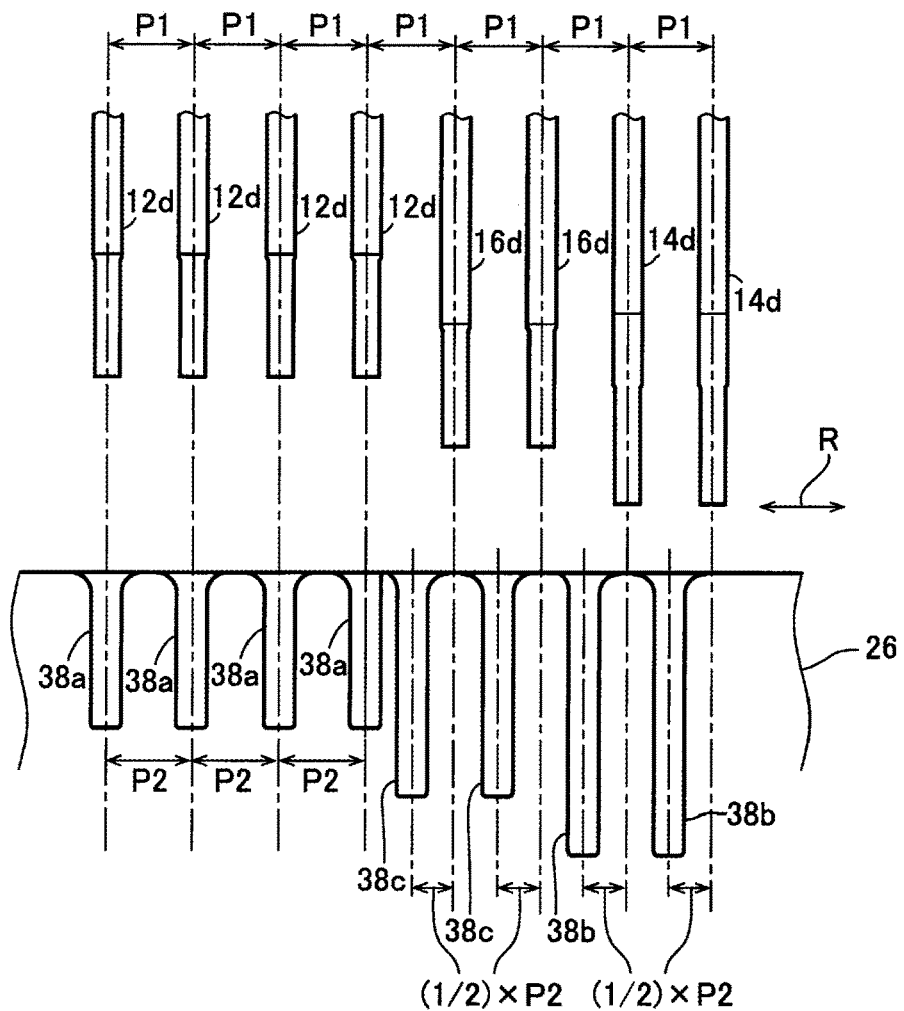
[Fig. 11B]
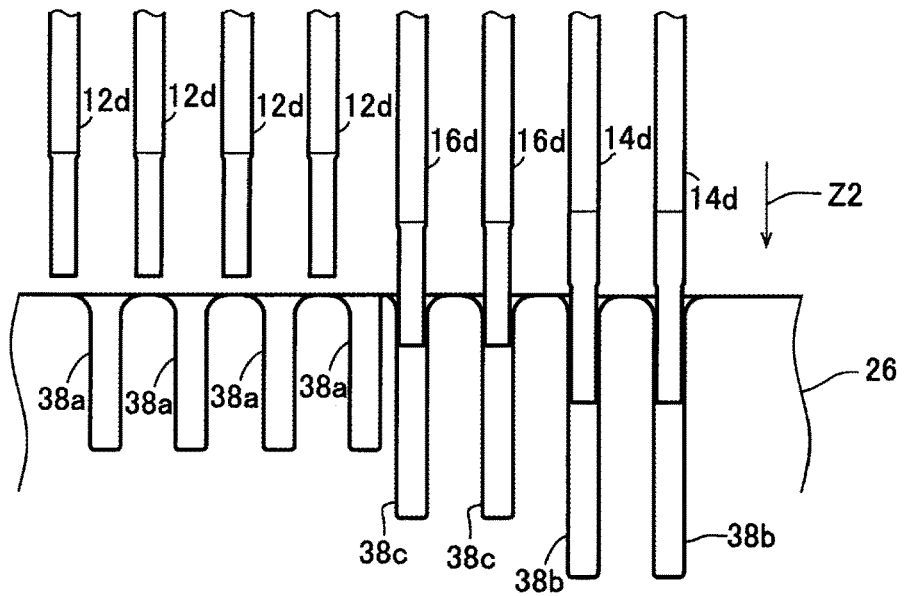

TWISTING METHOD OF COIL SEGMENTS, TWISTING JIG AND TWISTING APPARATUS

FIELD

The present invention relates to a twisting method of coil segments of a stator of an electrical rotating machine such as a motor or a generator, and a twisting jig and twisting apparatus used in a twisting process of coil segments.

BACKGROUND

As a coil of a stator of an electrical rotating machine such as a motor or a generator, a so-called segment type coil is known. This segment type coil is obtained by inserting a plurality of U-shaped coil segments each having a pair of slot insertion portions extending linearly, into a plurality of slots arranged along a circumferential direction of a stator core (hereinafter, abbreviated as a core) so as to straddle the slots to form a plurality of layers in a radial direction of the core, twisting distal end portions in the insertion direction of these coil segments protruding from the core end face in opposite directions for each layer, and electrically joining the distal end portions in adjacent layers in the radial direction of the core by welding or the like. The U-shaped coil segment is also referred to as a hairpin.

The twisting process includes concepts of twisting and folding, and is hereinafter abbreviated as twisting.

Among the coil segments described above, those to be a lead line such as an input line and a neutral line are included, and these coil segments are variant coil segments with longer protruding lengths from the end face of the core than normal coil segments whose distal end portions are to be joined with each other.

In a conventional twisting technique, when the twisting is performed, distal end portions of the normal coil segments and distal end portions of the variant coil segments located in the same layer as the normal coil segments are inserted into the same twisting jig and twisted by rotation of the twisting jig, circumferentially in the same direction for each layer and in the opposite direction to the coil segments in the adjacent layer in the radial direction.

Therefore, after the twisting, the distal end portions of the variant coil segments come to the same positions in the circumferential direction as the distal end portions of the normal coil segments. That is, rows of junctions of the distal end portions of the normal coil segments and the distal end portions of the variant coil segments come to positions aligned in the radial direction of the core.

According to such a conventional technique, for example, when electrically connecting lead lines formed by variant coil segments in a layer (innermost layer) located at the innermost position of the core with terminal members disposed outside in the radial direction, the connections must be configured to stride over the rows of junctions of the distal end portions of the normal coil segments.

Although not being configured by inserting U-shaped ones, in the coil described in PTL1, the method as described above is adopted for reducing the size by bending end portions of the coil in the radial direction of the core, as apparent from FIG. 17(B) thereof.

CITATION LIST

Patent Literature

[PTL1] Japanese Patent Application Laid-Open Publication No. 2009-11116

SUMMARY

Problem

In the connection configuration described above in which the lead lines stride over the rows of junctions, the variant coil segments should have long lead portions, which leads to an increase in material cost of the coil segments made of copper, aluminum, or the like.

Further, in this type of stator, smaller protrusion amount of the coil from its core end face contributes to downsizing of motors or the like, and even a millimeter-order difference affects, and thus the connection configuration described above hinders the downsizing.

Further, when the rising height of the lead lines is large, since rigidity of connecting portions between the lead lines and the terminal members is reduced, natural frequency of lead portions is reduced. Therefore, for example, there is a concern that resonance with vibration caused by rotation of a vehicle engine may cause disconnection stress in the wiring portions.

The present invention has been made in view of such current circumstances, and it is an object of the present invention to reduce cost and improve rigidity of a connecting portion between a coil segment and a terminal member in a stator of an electrical rotating machine using coil segments, and thereby contributing downsizing of the electrical rotating machine.

Solution

To achieve the above object, a twisting method of coil segments according to the present invention includes firstly preparing a workpiece in which a plurality of coil segments are inserted into a plurality of slots arranged in a circumferential direction of a core configured to form a stator of an electrical rotating machine, distal end portions of the respective coil segments projecting from an end face of the core toward an insertion direction of the inserting form a plurality of layers in a radial direction of the core, and short distal end portions being any of the distal end portions each of which is to be joined to a distal end portion of another coil segment and a long distal end portion projecting from the end face of the core longer than the short distal end portions are disposed in one layer among the plurality of layers.

Then primary twisting is performed such that a twisting jig is rotated by a predetermined amount, in a state where the long distal end portion is at least partially inserted into a second receiving recess of the twisting jig and the short distal end portions are not inserted into first receiving recesses of the twisting jig, the twisting jig comprising the first receiving recesses configured to receive the short distal end portions and the second receiving recess configured to receive the long distal end portions, and then secondary twisting is performed such that the twisting jig is rotated by an amount larger than the predetermined amount, in a state where the long distal end portion is kept at least partially inserted into the second receiving recess and the short distal end portions are at least partially inserted into the first receiving recesses, respectively.

In the twisting method of coil segments according to the present invention, the distal end portions of the plurality of coil segments are twisted through the primary twisting and the secondary twisting such that the long distal end portion is arranged between adjacent short distal end portions when viewed in the circumferential direction.

In the above twisting method of coil segments, it is preferable that, before performing the primary twisting, in a state where the long distal end portion is at least partially inserted into the second receiving recess of the twisting jig, each of the first receiving recesses is placed at a position displaced in the circumferential direction with respect to each short distal end portion to be received by the first receiving recess, and after performing the primary twisting, each of the first receiving recesses comes to a position substantially opposing to each short distal end portion to be received by the first receiving recess.

Further, it is preferable that the one layer in which the long distal end portion is disposed is an innermost layer or an outermost layer in the radial direction.

Further, it is preferable that the predetermined amount of the rotation of the twisting jig in the primary twisting is approximately ½ of a pitch of the slots, and the amount of the rotation of the twisting jig in the secondary twisting is one or more times the pitch of the slots.

Further, it is preferable that the secondary twisting is performed to rotate the twisting jig in an opposite direction to that in the primary twisting.

Further, the present invention can be implemented also as a twisting jig or a twisting apparatus suitable for implementation of the above-mentioned twisting method, in addition to the above-mentioned implementation as a method. It is not precluded to implement the present invention as a method of operating the twisting device, a computer program used for controlling the twisting device, and a computer-readable recording medium storing such a program.

Effects

According to the above configuration, in a stator of an electrical rotating machine using coil segments, cost of a connecting portion between a coil segment and a terminal member can be reduced and rigidity thereof can be improved, and this can contribute downsizing of the electrical rotating machine.

BRIEF DESCRIPTION OF DRAWINGS

FIG. 1 is a perspective view showing an example of a stator of an electrical rotating machine manufactured using a twisting method of coil segments according to the present invention.

FIG. 2A is a schematic perspective view showing an example of a normal coil segment.

FIG. 2B is a schematic perspective view showing an example of a variant coil segment.

FIG. 2C is a schematic perspective view showing an example of a coil segment having a distal end portion to be a neutral point.

FIG. 3 is an enlarged perspective view of a main portion of FIG. 1.

FIG. 4 is a schematic sectional view taken along Iv-Iv line of FIG. 1.

FIG. 5 is a schematic configuration diagram of a twisting apparatus which is an embodiment of the present invention FIG. 6 is an exploded perspective view of a twisting jig in the twisting apparatus of FIG. 5.

FIG. 7 is a schematic cross-sectional view of the inner twisting jig 26 taken along VII-VII line of FIG. 6.

FIG. 8A is a diagram for explaining twisting operation by the twisting apparatus shown in FIG. 5, showing positional relationship between the coil segments before being twisted and the receiving recesses of the inner twisting jig as a linearly developed diagram.

FIG. 8B is a diagram corresponding to FIG. 8A, showing the positional relationship between the coil segments before being twisted and the receiving recesses of the inner twisting jig at a position different from that of FIG. 8A.

FIG. 8C is a diagram corresponding to FIG. 8A, showing positional relationship between the coil segments and the inner twisting jig at a start timing of twisting.

FIG. 8D is a diagram showing a state in which the distal end portions of the variant coil segments are partially inserted into the second receiving recesses, from the state of FIG. 8C.

FIG. 8E is a diagram showing a state in which a primary twisting is performed by rotating the inner twisting jig, from the state of FIG. 8D.

FIG. 8F is a diagram showing a state in which the distal end portions of the normal coil segments are inserted into the first receiving recesses, from the state of FIG. 8E.

FIG. 8G is a diagram showing a state in which a second twisting is performed from the state of FIG. 8F.

FIG. 9 is a perspective view of a main part of the core and the coil segments showing input lead lines at a time of completion of the secondary twisting.

FIG. 10A is a schematic diagram for explaining a step of bending the input lead line after the secondary twisting, showing a state of the input lead line at a time of completion of the secondary twisting.

FIG. 10B is a diagram showing a state in which the bending is completed after the state of FIG. 10A.

FIG. 11A is a diagram corresponding to FIG. 8A, showing a positional relationship between the coil segments before being twisted and the receiving recesses of the inner twisting jig regarding a twisting jig according to a modification example.

FIG. 11B is a diagram corresponding to FIG. 8D, for explaining twisting operation in the modification example

DESCRIPTION OF EMBODIMENTS

Hereinafter embodiments of the present invention will be described with reference to the drawings.

First, with reference to FIG. 1, a schematic configuration of an example of a stator of an electrical rotating machine which can be manufactured using a twisting method of coil segments according to the present invention will be described.

FIG. 1 is a perspective view of the stator.

The stator 2 shown in FIG. 1 includes: a hollow-cylindrical core 6 having a plurality of slots 4 arranged in the circumferential direction; and a coil 8 of three phases (U-phase, V-phase, W-phase) configured by inserting a plurality of U-shaped coil segments (segment conductor) into the slot 4 so as to straddle the slots 4 and connecting the coil segments. Reference numeral 5 denotes an insulating sheet for insulating the coil segments from the core 6. In the following description, reference numerals including "U" denote configurations related to the U-phase coil. The same applies to "V" and "W".

Each coil segment is inserted into the slot 4 from the lower side in the figure along an axial direction of the core 6, and a portion protruding from the end face on the upper side (input side or power supply side) in the axial direction of the core 6 in the figure is bent in the circumferential direction of the core 6 by a twisting jig described later. The bending (twisting) is performed in opposite directions for each layer adjacent in the radial direction of the core 6, and the distal end portions of the coil segments facing each other between layers adjacent in the radial direction after the twisting are electrically joined with each other.

Although FIG. 1 shows the state before the joining, in the following description, a configuration of the distal end portions facing each other (to be exact, a configuration where portions of coil segments in which insulation films are removed at distal ends of the coil segments are opposed to each other) is referred to as a junction 10.

In the stator 2, slot insertion portions (described later) of six coil segments are inserted into each slot 4. Since thicknesses of all the coil segments are common, the radial arrangement of the six slot insertion portions inserted into one slot 4 is common for all the slots. Therefore, the six slot insertion portions inserted into one slot can be regarded to form six layers stacked from the outermost circumferential side to the innermost circumferential side, and in this specification, the term "layer" means this layer of the slot insertion portions unless otherwise specified.

The core 6 has a configuration in which thin annular electromagnetic steel plates formed by punching or etching are laminated in the cylindrical axial direction and integrated with one another. A plurality of teeth 7 (magnetic pole teeth) projecting toward the center of the core 6 are formed radially on the inner circumferential side of the core 6 at predetermined circumferential intervals. An inner peripheral surface of the core 6 is substantially formed by surfaces on the distal end side of the respective teeth 7, but the surfaces on the distal end side of the respective teeth 7 are separated from one another. In order to make the reference numerals near the center of FIG. 1 easy to see, a portion of the figure is filled with white, but also in the filled part, the respective teeth 7 are also separated from one another. Further, slots 4 are formed between adjacent teeth 7.

The number of poles (magnetic poles) of the not-shown rotor to be inserted into the stator 2 of the present embodiment is eight, and the number of slots per phase in the coil 8 of three phases with respect to the pole number eight is two. Accordingly, a total of forty-eight slots 4 are arranged in the core 6.

Here, an exemplary coil-segment is shown in FIG. 2A.

Each coil segment is formed by deforming a rectangular wire with its surface covered with an insulating film into a U-shape by bending. Specifically, as shown in FIG. 2A, a coil segment 12 has a pair of slot insertion portions 12a, 12b respectively extending in straight lines, and a connecting portion 12c connecting them, and the connecting portion 12c has a stepped shape so as to dispose one slot insertion portion 12a and the other slot insertion portion 12b in different layers.

Reference numeral 12d shows a range protruding from the end face of the core 6 when the coil segment 12 is inserted into the core 6. Further, at a portion of a predetermined length on the distal end side along the insertion direction of each slot insertion portion 12a, 12b (in a range narrower than the range indicated by the reference numeral 12d), the insulation film is removed, and this portion can be electrically connected with a slot insertion portion of another coil segment, a connection terminal, or the like.

The coil segments of the present embodiment include: a normal coil segment 12 having the slot insertion portions 12a, 12b with the same length as shown in FIG. 2A, distal end portions thereof being to be connected to other coil segments at junctions 10, respectively, as shown in FIG. 1; and, in addition to that, a variant coil segment 14 having a slot insertion portion to protrude longer from the end face of the core 6 than that of the coil segment 12; and a coil segment 16 having a slot insertion portion to similarly protrude longer from the end face of the core 6 than that of the coil segment 12 and to form a neutral line.

FIG. 2B shows an exemplary variant coil segment 14. The variant coil segment 14 is in common with the coil segment 12 in that it has a pair of slot insertion portions 14a, 14b respectively extending in straight lines and a connecting portion 14c connecting them, and the connecting portion 14c has a stepped shape (crank-shape) for layer change.

However, although one slot insertion portion 14b of the variant coil segment 14 is longer than the other slot insertion portion 14a having similar length to the slot insertion portions 12a, 12b of the normal coil segment 12. The distal end portion of the slot insertion portion 14b protrudes longer from the end face of the core 6 than the distal end portions of the slot insertion portion portions 12a, 12b, 14a, and the distal end portion is to be an input lead line. Reference numeral 14d shows a range in which the slot insertion portion 14b protrudes from the end face of the core 6 when the coil segment 14 is inserted into the core 6. On the slot insertion portion 14a side, a portion of the same length as 12d in FIG. 2A protrudes.

Hereinafter, the portion indicated by reference numeral 14d is referred to as a long distal end portion, and a portion indicated by reference numeral 12d is referred to as a short distal end portion.

Further, an exemplary coil segment 16 having a distal end portion to be a neutral line in FIG. 2C.

Also in the coil segment 16, one slot insertion portion 16b is slightly longer than the other slot insertion portion 16a.

Strictly speaking, also in the normal coil segment 12, the protruding length from the end face of the core 6 of each slot insertion portion is slightly different one another depending on which layer the slot insertion portion forms, corresponding to that the circumferential length between the slots 4 is different depending on positions in the radial direction of the core 6.

However, since the difference in the lengths between the slot insertion portions of the coil segments 12, 16 is smaller than m in FIG. 2B, only (the distal end portion 14d of) the slot insertion portion 14b of the coil segment 14 is considered to be an object of primary twisting described later, as a slot insertion portion 14b longer than the others.

Returning to explanation of FIG. 1, six slot insertion portions are inserted into each slot 4 such that the inserted slot insertion portions align in one row along the radial direction of the core 6 as described above. The coil of each phase has a configuration wherein multiple coil segments are connected in series by electrically connecting slot insertion portions facing at the junction 10, thereby forming two coils respectively having approximate six turns around the core 6 and being disposed at circumferentially different positions, and further the two coils are connected in parallel. Each coil is routed from the innermost layer toward the outermost layer and then returning to the innermost layer, and both ends of the coil are located in the innermost layer.

As shown in FIG. 1, in the innermost layer of the core 6, input lead lines 14U1, 14U2, 14V1, 14V2, 14W1, 14W2 respectively formed by bending the long distal end portions 14d of the variant coil segments 14 are disposed. Each of the distal end portions of these lead lines are electrically connected to some of terminal members 15U, 15V, 15W which are connected to an AC output portion of an inverter, for example. The input lead lines 14U1 to 14W2 denoted by the reference numerals in FIG. 1 are located at one ends of the respective coils, and for example, the terminal member 15U serves also to connect the two coils of U-phase in parallel. The same applies to V-phase and W-phase.

Further, in the innermost layer, neutral lines 16U1, 16U2, 16V1, 16V2, 16W1, 16W2 respectively formed by the distal end portions of the longer slot insertion portions of the coil segments 16 are also disposed, which are electrically connected to a not-shown long plate-shaped common conductor as a neutral point. The neutral lines 16U1 to 16W2 are located at the other ends of the respective coils.

FIG. 3 is an enlarged view of a main part of FIG. 1.

As shown in FIG. 3, the input lead lines 14U1, 14U2, 14V1, 14V2 are disposed so as to lie between the junctions 10 of the coil segments 12 joined to each other, in the circumferential direction of the core 6 (in circumferential gaps 21 between the rows of junctions 10 aligned in the radial direction). The input lead lines 14W1, 14W2 not shown in FIG. 3 (shown in FIG. 1) are similarly disposed.

That is, the distal end portions of the variant coil segments 14, which are located in the innermost layer at one end side in the radial direction and protrudes from the end face of the core 6 longer than the normal coil segment 12 having distal end portions to be joined at the junctions 10, is disposed so as to lie in the gap 21 between the junctions 10 and derived to the other end side (the outermost peripheral side) in the radial direction.

More specifically, each of the input lead lines 14U1, 14U2, 14V1, 14V2 comprises: a bent portion 14*d*-1 formed by bending (twisting) the long distal end portion 14*d* of the variant coil segment 14 with the short segment end portion 12*d* of the normal coil segment 12 in the same layer to the same direction; a deriving portion 14*d*-2 extending from the inner peripheral side to the outer peripheral side in the gap 21 between the rows of the junctions 10; and a rising portion 14*d*-3 which rises in the axial direction of the core 6 from the tip of the deriving portion 14*d*-2 at a position projected outward from the outermost layer. The respective rising portions 14*d*-3 are connected to the terminal members 15U or 15V.

The deriving portion 14*d*-2 is a portion which is bent in the radial direction at a position corresponding to the gap 21.

The input lead lines 14W1, 14W2 shown in FIG. 1 also have the same configuration.

FIG. 4 shows a schematic cross-sectional view taken along IV-IV line of FIG. 1.

By adopting the above terminal connection configuration by the input lead lines and the terminal members, as shown in FIG. 4, the input lead line 14U1 can be connected to the terminal member 15U with lower height from the end face of the core, resulting in a short distance. The same applies to the other input lead lines.

Thus, in comparison with the conventional structure wherein the input lead lines are raised at the positions of the innermost layer and the terminal members are connected with the input lead lines striding over the rows of the junctions 10, material cost of the coil segments can be reduced. Further, since the height of the deriving portions 14*d*-2 of the input lead lines in the axial direction of the core 6 can be reduced, this greatly contributes to downsizing of the stator 2.

Although the rising length of the rising portion 14*d*-3 is relatively long in the configuration of FIG. 4, even if the rising length is smaller than that, or also without providing the rising portion 14*d*-3, it is possible to connect the coil with the terminal member through the terminal connection configuration described here. According to these configurations, it is possible to further increase the effect of the material cost reduction of the coil segments and the downsizing of the stator 2.

Further, since it is possible to reduce height of the deriving portion 14*d*-2 of the input lead line in the axial direction of the core 6, it is possible to increase rigidity of the connecting portions between the input lead lines and the terminal members. This makes it possible to increase natural frequency of the input lead lines. That is, in spite that natural frequency of the input lead lines is reduced when rigidity of the connecting portions is low, it is possible to suppress this reduction. By increasing the natural frequency in this way, for example, a risk such that the connecting portion brings disconnection stress to wiring portions because of resonance with the vibration associated with rotation of a vehicle engine can be reduced.

Next, referring to FIG. 5 to FIG. 8G, a twisting method of coil segments capable of realizing a terminal connection configuration having the above effects, and embodiments of a twisting jig used in the twisting method and a twisting apparatus for implementing the twisting method will be described.

FIG. 5 is a schematic configuration diagram of a twisting apparatus according to an embodiment of the present invention.

As shown in FIG. 5, the twisting apparatus 18 includes: a work holding mechanism 20 configured to hold a stator 2, in which appropriate coil segments are inserted into the respective slots 4 of the core 6, before the twisting process such that the protruding distal end portions of the coil segments face downward; a twisting jig 22; a rotary drive mechanism 24 configured to rotationally drive the twisting jig 22; a controller 25 configured to control the rotary drive mechanism 24 and execute a twist program; and the like.

The twisting jig 22 is a tool for bending, along the circumferential direction of the core 6, the distal end portions in the insertion direction of the slot insertion portions of the coil segments 12, 14, 16, which are inserted into a plurality of slots 4 of the core 6 shown in FIG. 1, protrude from the end surface of the core 6, and are located in the innermost layer and its adjacent layer (second layer from the inner peripheral side).

The twisting jig 22 includes: an inner twisting jig 26 configured to twist the distal end portions of the slot insertion portions disposed in the innermost layer; and an outer twisting jig 28 configured to twist the distal end portions of the slot insertion portions disposed in the second layer from the inner peripheral side. The inner twisting jig 26 has a diameter corresponding to the innermost layer in the radial direction in which the long distal end portions 14*d* forming the slot insertion portions 14*b* of the variant coil segments 14 are disposed, and the outer twisting jig 28 has a diameter corresponding to the second layer from the inner peripheral side.

The rotary drive mechanism 24 includes rotary drive mechanisms configured to rotationally drive the inner twisting jig 26 and the outer twisting jig 28, respectively. The rotary drive mechanisms drive the inner twisting jig 26 by the power of the motor 30, and drive the outer twisting jig 28 by the power of the motor 32. The motor 30 and the motor 32 are connected to the controller 25 via a motor driver. Data such as rotation amount and rotation direction of the inner twisting jig 26 and the outer twisting jig 28 are stored in a non-volatile memory 25*a* of the controller 25, and the controller 25 controls the rotary drive mechanism 24 based on the data.

The work holding mechanism 20 can be moved in the vertical direction (arrow Z direction) by the drive mechanism 34, and the lowering movement of the stator 2 and the rotation operation of the twisting jig 22 are performed simultaneously under control by the controller 25 at the time of the twisting operation.

FIG. 6 is an exploded perspective view of the twisting jig in the twisting apparatus of FIG. 5.

As shown in FIG. 6, the inner twisting jig 26 includes: a hollow-cylindrical jig body 36 to be connected to the rotary drive mechanism 24; and first receiving recesses 38a, second receiving recesses 38b and third receiving recesses 38c respectively formed on the outer peripheral surface of the jig body 36 at the upper end portion thereof in the axial direction. The first receiving recesses 38a, the second receiving recesses 38b, and the third receiving recesses 38c are formed at circumferential intervals.

FIG. 7 is a schematic cross-sectional view of the inner twisting jig 26 taken along VII-VII line of FIG. 6.

As shown in FIG. 7, on the bottom surface 36a of the jig body 36, an insertion hole 36b to which a drive shaft of the rotary drive mechanism 24 is to be inserted is formed, and multiple (four here) screw holes 36c are further formed at equal circumferential intervals. The jig body 36 is fastened to the rotary drive mechanism 24 using bolds through these screw holes 36c.

On the upper end side of the jig body 36, a stepped annular guide surface 36d configured to guide distal end portions of slot insertion portions of respective coil segments into the respective receiving recesses are formed.

The first receiving recesses 38a receive distal end portions (short distal end portions 12d) of slot insertion portions forming pairs of slot insertion portions to be electrically connected to each other to form the junctions 10, respectively, among the slot insertion portions of the coil segments 12, 14, 16.

The second receiving recesses 38b receive distal end portions (long distal end portions 12d) of slot insertion portions 14b to be input lead lines 14U1, 14U2, 14V1, 14V2, 14W1, 14W2, respectively.

The third receiving recesses 38c have an axial direction height smaller than that of the second receiving recesses 38b and larger than that of the first receiving recesses 38a, and receive distal end portions (see FIG. 2C; hereinafter, referred to as distal end portions 16d) of slot insertion portions 16b which are longer slot insertion portions of coil segments 16 to be neutral lines, respectively.

Incidentally, the range of each distal end portion to be housed in the first receiving recess 38a is a range, in the slot insertion portion of each coil segment 12, 14, 16 (slot insertion portion 14a regarding the coil segment 14), from the tip of the slot insertion portion to approximately the portion rising in the axial direction of the core 6 in FIG. 1. This is, for example, a part of the range shown as the short distal end portion 12d.

The range of each long distal end portion 14d to be housed in the second receiving recess 38b is a range, in the slot insertion portion 14b of each coil segment 14, from the tip of the slot insertion portion 14b to approximately the portion forming the deriving portion 14-2 and rising portion 14-3 in FIG. 3. This is a part of the range shown as the long distal end portion 14d.

The range of each distal end portion 16d to be housed in the third receiving recess 38c also conforms to these.

As shown in FIG. 6, the outer twisting jig 28 includes: a hollow-cylindrical jig body 40; and a flange portion 42 formed integrally with the jig body 40 on the lower surface of the jig body 40. On the inner peripheral surface of the axial upper end portion of the jig body 40, receiving recesses 40a configured to receive distal end portions of slot insertion portions disposed in the second layer from the inner peripheral side are formed at circumferential intervals. The height of each receiving recess 40a is similar to that of the first receiving recesses 38a of the inner twisting jig 26.

The outer twisting jig 28 is connected to the rotary drive mechanism 24 via a flange portion 42 and a gear configuration such as a worm gear.

The inner twisting jig 26 and the outer twisting jig 28 respectively prevent, by the side surface portions thereof, slot insertion portions being inserted into the receiving recesses of the other twisting jig from falling off, each other.

Next, referring to FIG. 8A to FIG. 8G, an operation to position long distal end portions 14d of variant coil segments in gaps 21 between rows of junctions 10 using the inner twisting jig 26 that is a single twisting jig, and a configuration for the operation will be described. The operation described herein is an embodiment of twisting method of coil segments of the present invention.

Incidentally, in FIG. 8A to FIG. 8G, for ease of understanding, a portion of the arrangement of the distal end portions of the coil segments and the arrangement of the receiving recesses of the inner twisting jig 26 corresponding thereto in the circumferential direction are linearly developed so as to schematically show positional relation of these objects. Further, each of the short distal end portions 12d, the long distal end portions 14d and the distal end portions 16d in the figures includes a portion where the insulation film is peeled off and a portion where the insulation film is not peeled off.

As shown in FIG. 8A, in a state before the twisting, the short distal end portions 12d of the normal coil segments 12 and the long distal end portions 14d of the variant coil segments 14, protruding from the end face of the core 6 of the stator 2, are disposed at the same slot pitch P1 in the circumferential direction of the core 6 (arrow R direction). The slot pitch P1 is the formation pitch of the slots 4.

As shown in FIG. 8B, the longer slot insertion portions of the coil segments 16 are also disposed at the same slot pitch P1.

Corresponding to this, the first receiving recesses 38a of the inner twisting jig 26 are formed in accordance with the positions in the circumferential direction of the short distal end portions 12d disposed in the slots 4 so that the respective first receiving recesses 38a can house corresponding short distal end portions 12d by bringing the stator 2 including the core 6 close to the inner twisting jig 26 along the central axis thereof.

On the other hand, the second receiving recesses 38b are formed at positions displaced in the circumferential direction (left side in the figure) with respect to the long distal end portions 14d to be housed in the second receiving recesses 38b, in a state where the respective first receiving recesses 38a and the short distal end portions 12d to be housed therein face each other. That is, the second receiving recesses 38b are disposed at positions displaced from the formation cycle of the first receiving recesses 38a.

In the present embodiment, the amount of displacement of the second receiving recesses 38b is ½ of the formation pitch P2 (=the slot pitch P1) of the first receiving recesses 38a.

In FIG. 8B, positional relation between the third receiving recesses 38c and the second receiving recesses 38b is shown in the same manner as in FIG. 8A.

As can be seen from comparison between FIG. 8A and FIG. 8B, also the third receiving recesses 38c are formed in accordance with the positions in the circumferential direction of the distal end portions 16d being longer distal end portions of the coil segments 16 disposed in the slots 4, similarly to the first receiving recesses 38a, so that the respective third receiving recesses 38c can house corresponding distal end portions 16d by bringing the stator 2 including the core 6 close to the inner twisting jig 26 along the central axis thereof. Incidentally, if circumferential position of the inner twisting jig 26 is adjusted so that the respective first receiving recesses 38a can house corresponding short distal end portions 12d, the respective third receiving recesses 38c can house corresponding distal end portions 16d at that position.

In the twisting method of this embodiment, firstly a stator 2 that is a core 6 with the coil segments inserted therein is prepared as a workpiece, and set to the twisting apparatus 18 of FIG. 5. Then, by driving the inner twisting jig 26, its circumferential position is moved to a position for starting primary twisting.

The position is, as shown in FIG. 8C, a position where the long distal end portions 14d and the second receiving recesses 38b of the inner twisting jig 26 face each other.

As can be seen from comparison with FIG. 8A, in this state, the first receiving recesses 38a come to positions displaced with respect to the short distal end portions 12d to be housed therein. The imaginary lines L indicate the positions where the long distal end portions 14d are located in the state shown in FIG. 8A.

Next, from the state shown in FIG. 8C, the stator 2 is lowered as indicated by the arrow Z2 by the operation of the drive mechanism 34 controlled by the controller 25, and thereby the long distal end portions 14d of the variant coil segments 14 are partially inserted into the second receiving recesses 38b as shown in FIG. 8D. Lowering amount of the stator 2 is set such that the short distal end portions 12d are not housed in the first receiving recesses 38a of course, and also the distal end portions 16d being longer slot insertion portions of the coil segments 16 to be neutral lines are not housed in the third receiving recesses 38c. The vertical position of the distal end portions 16d in the state of FIG. 8D is shown by an imaginary line in the figure. The setting of the lowering amount can be stored in the nonvolatile memory 25a of the controller 25.

Next, the inner twisting jig 26 is rotationally driven by a predetermined amount in the R1 direction while the long distal end portions 14d are kept partially housed in the second receiving recesses 38b as shown in FIG. 8D, to perform the primary twisting.

FIG. 8E shows a state after the primary twisting. The primary twisting deforms the long distal end portions 14d obliquely.

In the present embodiment, the predetermined amount of rotation of the inner twisting jig 26 in the primary twisting is ½ of the formation pitch P2 of the first receiving recesses 38a. That is, the rotation is performed by the above-described amount of displacement of the second receiving recesses 38b. Strictly speaking, it is preferable to set the rotation amount in consideration of the spring back in addition to (½)×P2.

At the time of the primary twisting, the short distal end portions 12d and the distal end portions 16d are not moved, because they are not inserted into the first receiving recesses 38a and the third receiving recesses 38c, respectively. Accordingly, from the relation to the above-described rotation amount, as shown in FIG. 8E, the short distal end portions 12d and the distal end portions 16d respectively face the first receiving recesses 38a and the third receiving recesses 38c after completion of the primary twisting.

Therefore, in this state, the short distal end portions 12d and the distal end portions 16d can be respectively inserted into the first receiving recesses 38a and the third receiving recess 38c so as to be housed therein, by further lowering the stator 2 as indicated by arrow Z2, as shown in FIG. 8F.

In this state, the secondary twisting of rotating the inner twisting jig 26 by an amount larger than the predetermined amount in the primary twisting is performed. There may be a time lag between the primary twisting and the secondary twisting, or the operation may continuously transit from the primary twisting to the secondary twisting.

When lowering the stator 2 as described above, the long distal end portions 14d having been twisted in the primary twisting will be further deeply inserted into the second receiving recesses 38b in a state of being deformed obliquely. The inlet of each receiving recess (at least the second receiving recess 38b) of the inner twisting jig 26 is provided with a region processed into a round shape and the region is polished, thereby preventing scratch on the insulation film on the surface of the coil segment 14 during the insertion, even if the inlet of the second receiving recess 38b is in contact with the insulation film.

The secondary twisting is performed in the opposite direction to that in the primary twisting, as shown in FIG. 8G. That is, the inner twisting jig 26 is rotationally driven in the opposite direction (arrow R2 direction) to that in the primary twisting.

The rotation amount of the inner twisting jig 26 in the secondary twisting is one or more times the formation pitch P2 of the first receiving recesses 38a. It is not limited to an integral multiple of P2.

FIG. 9 shows a configuration of the input lead line at the time of completion of the secondary twisting described above.

In the present embodiment, the rotation amount of the inner twisting jig 26 in the secondary twisting is three times the formation pitch P2 of the first receiving recesses 38a. Thus, the short distal end portions 12d of the normal coil segments 12 are displaced by three times the formation pitch P2 of the first receiving recesses 38a (=three slot-pitches). On the other hand, regarding the long distal end portions 14d of the variant coil segments 14, the displacement by the primary twisting is offset by the secondary twisting in the opposite direction. Therefore, the long distal end portions 14d come to positions displaced by 2.5 times the formation pitch P2 of the first receiving recesses 38a, i.e., at positions corresponding to the gaps 21 between the junctions 10 of the distal end portions in the circumferential direction as shown in FIG. 9, in a state where the long distal end portions 14d stand perpendicularly to the end face of the core 6.

The third receiving recesses 38c are formed without "displacement" as in the case of the second receiving recesses 38b, with respect to the formation cycle of the first receiving recesses 38a. Accordingly, the distal end portions 16d of the coil segments 16 are arranged so as to be aligned with the rows of the junctions 10 in the radial direction after the secondary twisting.

Further, although not essential, in this embodiment, also the outer twisting jig 28 is rotationally driven in the opposite direction to that of the inner twisting jig 26 at the same time as the secondary twisting using the inner twisting jig 26, so that the twisting of the coil segments of the second layer from the inner circumferential side is performed. All of the receiving recesses 40a configured to receive the distal end portions of the coil segments in the second layer are in the same size as the first receiving recesses 38a. This is because the distal end portions arranged in the second layer are those for being joined.

Since the width in the circumferential direction of the gaps 21 is larger than the width in the circumferential direction of the wire rod forming the variant coil segments 14, the rotation amount of the inner twisting jig 26 in the primary twisting (½ of the formation pitch of the first receiving recesses 38a) and the rotation amount of the inner twisting jig 26 in the secondary twisting (one or more times the formation pitch of the first receiving recesses 38a) do not have to be exact. That is, it is sufficient to set the rotation amounts so that the distal end portions 14d of the variant coil segments 14 can rise at positions not causing hindrance to the later-described bending process for laying them when the secondary twisting is completed.

As described above, in this embodiment, the first receiving recesses 38a and the second receiving recesses 38b are formed such that the first receiving recesses 38a come to positions displaced with respect to the short distal end portions 12d to be housed therein, at the time of the primary twisting performed in a state where the long distal end portions 14d are housed in the second receiving recesses 38b, and the short distal end portions 12d come to positions approximately facing the first receiving recesses 38a after the primary twisting. Then, the secondary twisting is performed after performing the primary twisting to only the variant coil segments 14. Thus, the positions of the long distal end portions 14d can be displaced from the positions of the rows of the junctions 10 using a single twisting jig (inner twisting jig 26), and thereby enabling to easily obtain the lying connection configuration described above.

Although the present embodiment is configured such that the secondary twisting is performed in the opposite direction to that of the primary twisting, even when the rotations are in the same direction, the same effect can be obtained, since the long distal end portions 14d advance longer by a predetermined amount through the primary twisting as compared with the short distal end portions 12d to form the junctions 10. Incidentally, it is more cost efficient from the viewpoint of material cost to perform the secondary twisting in the opposite direction to that of the primary twisting, because the bent portion 14-1 can be shortened and thus the long distal end portions 14d of the variant coil segments 14 can also be shortened.

Further, although respective distal end portions of the coil segments are inserted into the corresponding receiving recesses by moving the stator 2 in this embodiment, it is conceivable to move the twisting jig side, or both the stator 2 and the twisting jig.

In addition, during the secondary twisting, it is preferable to bring the stator 2 closer to the inside twisting jig 26 in conjunction with the rotation of the inside twisting jig 26. At this time, at least one of the stator 2 and the twisting jig 22 may be relatively moved in a direction along its central axis with respect to the other. That is, the twisting jig 22 side may be raised while fixing the stator 2 in the converse of the present embodiment, or even lowering of the stator 2 and raising of the twisting jig 22 side may be performed at the same time.

After the secondary twisting, bending processing for connecting to the terminal members 15U, 15V, 15W shown in FIG. 1 is performed on the long distal end portions 14d to be input lead lines 14U1, 14U2, 14V1, 14V2, 14W1, 14W2, standing vertically as shown in FIG. 9.

The bending process will be described with reference to FIG. 10A and FIG. 10B.

Referring to the input lead line 14U1 for example, this bending process for laying is performed through the following steps.

Firstly, as shown in FIG. 10A, a bending guide member 50 configured to guide bending of the root of the input lead line 14U1 is inserted from the radially outer side of the core 6, and in this state, the distal end portion of the input lead line 14U1 is housed in a bending member 52 of a processing device.

Then the long distal end portion 14d to be the input lead line 14U1 is bent so as to lie in the gap 21 by moving the bending member 52 obliquely as shown by an arrow Q in FIG. 10B, thereby the deriving portion 14d-2 is formed. Thereafter, the tip portion thereof is bent toward the axial direction of the core 6 by the bending member 52, thereby the rising portion 14d-3 is formed.

The same applies to the other input lead lines 14U2, 14V1, 14V2, 14W1, 14W2.

In the above, although it has been described that twisting of the coil segments in the innermost layer is performed by the twisting jig 22, it is possible to twist the portions protruding from the end face of the core 6 of the coil segments in the other layers, using twisting jigs corresponding to respective layers. Since there are no coil segments to be an input lead line in the other layers, the twisting jigs corresponding to the other layers may be provided with only the first receiving recesses 38a at equal intervals, and the second receiving recesses 38b and the third receiving recesses 38c are not necessary. The respective twisting directions are opposite to that of the adjacent layers. Further, it is preferable to perform the twisting for two layers at a time using two twisting jigs each.

Although the first to third receiving recesses 38a to 38c are formed in a longitudinal groove shape extending in the axial direction on the outer peripheral surface of the core 6 in the above embodiment, the receiving recesses may be formed on the inner peripheral surface of the jig body 36 or inside the jig body 36. Alternatively, the receiving recesses may be formed inside the side face of the jig body 36 as holes not being exposed to the side surface. Similarly, the receiving recesses 40a may be formed on the inner peripheral surface, the inside, the inside of the side surface, or the like of the jig body 40.

Further, although an example of laying the input lead lines in the gaps 21 in the circumferential direction between the junctions 10 of the normal coil segments and deriving the input lead lines from the inner peripheral side to the outer peripheral side is described in the above embodiment, the present invention is not limited thereto, and it is conceivable to derive the input lead lines from the outer peripheral side to the inner peripheral side. In this case, receiving recesses corresponding to the first to third receiving recesses 38a to 38c may be provided on a twisting jig having a diameter corresponding to the outermost layer, and a twisting process similar to that described with reference to FIG. 8A to FIG. 8G may be applied to the slot insertion portions in the outermost layer. Further, the object to be laid in the gap 21 is not limited to an input lead line.

Furthermore, although only the long distal end portions 14d of the variant coil segments 14 are twisted in the primary twisting in the above-described embodiment, the distal end portions 16d being longer slot insertion portions of the coil segments 16 may also be twisted in the primary twisting. In this modification, the distal end portions 16d being longer slot insertion portions of the coil segments 16

(the distal end portions to be neutral lines) can be disposed at positions corresponding to the gaps 21 between the junctions 10, similarly to the long distal end portions 14*d* of the variant coil segment 14.

FIG. 11A shows an exemplary arrangement of the first to third receiving recesses 38*a* to 38*c* for such primary twisting. The same reference numerals are used for portions corresponding to the configuration shown in FIG. 8A to FIG. 8G.

In the example shown in FIG. 11A, not only the second receiving recesses 38*b* but also the third receiving recesses 38*c* are formed at positions displaced in the circumferential direction (left side in the drawing) with respect to the distal end portions 16*d* to be housed in the third receiving recesses 38*c* in a state where the first receiving recesses 38*a* and the short distal end portions 12*d* to be housed therein are opposed to each other. That is, similarly to the second receiving recesses 38*b*, also the third receiving recesses 38*c* are formed at positions displaced from the formation cycle of the first receiving recesses 38*a*.

Displacement amount of the third receiving recesses 38*c* and the second receiving recesses 38*b* is ½ of the formation pitch P2 (=slot pitch P1) of the first receiving recesses 38*a*.

FIG. 11B shows a part of the twisting operation using the inner twisting jig shown in FIG. 11A.

By using the inner twisting jig 26 described with reference to FIG. 11A, when housing the long distal end portions 14*d* in the second receiving recesses 38*b* during the primary twisting, as shown in FIG. 11B, the distal end portions 16*d* being longer slot insertion portions of the coil segments 16 can also be housed in the third receiving recesses 38*c* at the same time. Therefore, the distal end portions 16*d* can also be objects of the primary twisting.

There is a method of welding the ends of the neutral lines to a single plate when connecting the neutral lines. However, if the height of an end of a conductor (a junction 10) circumferentially adjacent to the neutral line is equal to or higher than the height of the end of the neutral line, the plate may interfere with the end or insulating film of the adjacent conductor. Although this problem is particularly conspicuous in the configuration including the ½ pitch portion as in the present embodiment, such a problem can be avoided by twisting the distal end portions to be the neutral lines in the primary twisting as described above and thereby disposing the distal end portions in the gaps 21 of the junctions 10.

Furthermore, in the above embodiment, the first receiving recesses 38*a*, the second receiving recesses 38*b*, and the third receiving recesses 38*c* have different depths as shown in FIG. 6. However, in both cases of the primary twisting and the secondary twisting, when performing the twisting, it is not necessary that the distal end portions housed in the respective receiving recesses are inserted until they reach the bottom of the receiving recesses. Accordingly, each receiving recess may be formed deeper than the depth required for receiving the corresponding distal end portion. For example, the depth of each receiving recess may be the same as the deepest second receiving recesses 38*b* in FIG. 6. In this case, all the receiving recesses have the same shape. Further, the first receiving recesses 38*a* and the third receiving recesses 38*c* may be formed at equal intervals at a pitch of P2, and as described with reference to FIG. 8A, the second receiving recesses 38*b* may be formed at positions displaced by ½ of the pitch from positions according to the pitch of P2.

Preferred embodiments of the present invention are described above. However, the present invention is not limited to such specific embodiments, and various modifications and variations are conceivable. The above-described configuration of the present invention can be implemented by extracting only a part thereof, and the variations described in the above explanation can be applied in any combination as long as they do not conflict with each other. The effects described in the embodiments of the present invention are merely illustrative of the most preferred effects resulting from the present invention, and the effects according to the present invention are not limited to those described in the embodiments of the present invention.

REFERENCE SIGNS LIST 2 stator
4 slot
6 core
10 junction
12 normal coil segment
12*d* short distal end portion
14 variant coil segment
14*d* long distal end portion
16 coil segment having distal end portion to be neutral line
21 gap
22 twisting jig
25 controller
26 inner twisting jig
28 outer twisting jig
36, 40 jig body
38*a* first receiving recess
38*b* second receiving recess
38*c* third receiving recess

The invention claimed is:

1. A twisting method of coil segments comprising:
preparing a workpiece in which a plurality of coil segments are inserted into a plurality of slots arranged in a circumferential direction of a core configured to form a stator of an electrical rotating machine, distal end portions of the respective coil segments projecting from an end face of the core toward an insertion direction of the coil segments form a plurality of layers in a radial direction of the core, and short distal end portions being any of the distal end portions each of which is to be joined to a distal end portion of another coil segment and a long distal end portion projecting from the end face of the core longer than the short distal end portions in the same layer are disposed in one layer among the plurality of layers; and
twisting the distal end portions of the plurality of coil segments such that the long distal end portion is arranged between adjacent short distal end portions when viewed in the circumferential direction, by
performing primary twisting in which a twisting jig is rotated by a predetermined amount, in a state where the long distal end portion is at least partially inserted into a second receiving recess of the twisting jig and the short distal end portions are not inserted into first receiving recesses of the twisting jig, the twisting jig comprising the first receiving recesses configured to receive the short distal end portions and the second receiving recess configured to receive the long distal end portions, and then
performing secondary twisting in which the twisting jig is rotated by an amount larger than the predetermined amount, in a state where the long distal end portion is kept at least partially inserted into the second receiving recess and the short distal end portions are at least partially inserted into the first receiving recesses, respectively.

2. The twisting method of the coil segments according to claim 1,
wherein, before performing the primary twisting, in a state where the long distal end portion is at least partially inserted into the second receiving recess of the twisting jig, each of the first receiving recesses is placed at a position displaced in the circumferential direction with respect to each short distal end portion to be received by the first receiving recess, and
after performing the primary twisting, each of the first receiving recesses comes to a position substantially opposing to each short distal end portion to be received by the first receiving recess.

3. The twisting method of the coil segments according to claim 1,
wherein the one layer in which the long distal end portion is disposed is an innermost layer or an outermost layer in the radial direction.

4. The twisting method of the coil segments according to claim 1,
wherein the predetermined amount of the rotation of the twisting jig in the primary twisting is approximately ½ of a pitch of the slots, and the amount of the rotation of the twisting jig in the secondary twisting is one or more times the pitch of the slots.

5. The twisting method of the coil segments according to claim 1,
wherein the secondary twisting is performed to rotate the twisting jig in an opposite direction to that in the primary twisting.

6. A twisting jig configured to twist, in a circumferential direction of a core, distal end portions of a plurality of coil segments projecting from an end face of the core, the plurality of coil segments being inserted into a plurality of slots arranged in the circumferential direction of the core, the distal end portions projecting from the end face of the core toward an insertion direction of the coil segments forming a plurality of layers in a radial direction of the core, the twisting jig comprising:
cylindrical body;
first receiving recesses formed on the body at a circumferential interval and respectively configured to receive short distal end portions being any of the distal end portions each of which is to be joined to a distal end portion of another coil segment; and
second receiving recesses formed on the body at a circumferential interval and respectively configured to receive long distal end portions being any of the distal end portions each of which projects from the end face of the core longer than the short distal end portions in the same layer,
wherein the first receiving recesses and the second receiving recesses are disposed such that, in a state where the long distal end portions before being twisted are received by the second receiving recesses, each of the first receiving recesses is placed at a position displaced in the circumferential direction with respect to each short distal end portion to be received by the first receiving recess.

7. The twisting jig according to claim 6,
wherein displacement amount in the circumferential direction between each of the first receiving recesses with respect to each short distal end portion to be received by the first receiving recess, in the state where the long distal end portions before being twisted are received by the second receiving recesses, is approximately ½ of a pitch of the slots.

8. A twisting apparatus to which the twisting jig according to claim 6 is attachable, the twisting apparatus comprising:
a rotary drive mechanism configured to rotationally drive the twisting jig;
a linear drive mechanism configured to linearly drive (i) the core, with the plurality of coil segments inserted therein, along an axis direction of the core and relative to the twisting jig, (ii) the twisting jig along an axis direction of the twisting jig and relative to the core, or (iii) both of the core along the axis direction of the core and the twisting jig along the axis direction of the twisting jig; and
a controller connected to the rotary drive mechanism and to the linear drive mechanism,
wherein the controller is configured to control the rotary drive mechanism and the linear drive mechanism to firstly rotate the twisting jig by a predetermined first amount in a state where the long distal end portions are at least partially inserted into the second receiving recesses, respectively, and the short distal end portions are not inserted into the first receiving recesses, and then rotate the twisting jig by a second amount larger than the first amount in a state where the long distal end portions are kept at least partially inserted into the second receiving recesses and the short distal end portions are at least partially inserted into the first receiving recesses, respectively.

9. The twisting apparatus according to claim 8,
wherein the twisting jig has a diameter corresponding to one layer among an innermost layer or an outermost layer in the radial direction among the plurality of layers, the long distal end portions being disposed in the one layer.

10. The twisting apparatus according to claim 8,
wherein the first amount is approximately ½ of a pitch of the slots, and the second amount is one or more times the pitch of the slots.

* * * * *